US008832006B2

(12) United States Patent
Morinaga et al.

(10) Patent No.: US 8,832,006 B2
(45) Date of Patent: Sep. 9, 2014

(54) DISCRIMINANT MODEL LEARNING DEVICE, METHOD AND PROGRAM

(75) Inventors: Satoshi Morinaga, Tokyo (JP); Ryohei Fujimaki, Tokyo (JP); Yoshinobu Kawahara, Suita (JP)

(73) Assignee: NEC Corporation, Tokyo (JP)

( * ) Notice: Subject to any disclaimer, the term of this patent is extended or adjusted under 35 U.S.C. 154(b) by 2 days.

(21) Appl. No.: 13/484,638

(22) Filed: May 31, 2012

(65) Prior Publication Data

US 2013/0204810 A1    Aug. 8, 2013

Related U.S. Application Data

(60) Provisional application No. 61/596,313, filed on Feb. 8, 2012.

(51) Int. Cl.
*G06F 15/18*    (2006.01)

(52) U.S. Cl.
USPC .......................................................... 706/12

(58) Field of Classification Search
CPC ......... G06N 99/005; G06N 5/02; G06F 15/18
USPC .......................................................... 706/12
See application file for complete search history.

(56) References Cited

U.S. PATENT DOCUMENTS

| 2007/0156887 | A1* | 7/2007 | Wright et al. | 709/224 |
| 2010/0241639 | A1* | 9/2010 | Kifer et al. | 707/754 |

FOREIGN PATENT DOCUMENTS

| JP | 2011248740 A | 12/2011 |
| WO | 2008114863 A1 | 9/2008 |
| WO | 2011033744 A1 | 3/2011 |

OTHER PUBLICATIONS

International Search Report (PCT/ISA/210) dated Feb. 26, 2013 issued by the International Searching Authority in counterpart International Application No. PCT/JP2012/007899.
Written Opinion (PCT/ISA/237) dated Feb. 26, 2013 issued by the International Searching Authority in counterpart International Application No. PCT/JP2012/007899.
Mikhail Belkin et al., "Manifold Regularization: A Geometric Framework for Learning from Labeled and Unlabeled Examples", Journal of Machine Learning Research, Nov. 2006, pp. 2399-2434, vol. 7.
Burr Settles, "Active Learning Literature Survey", Computer Science Technical Report 1648, Jan. 26, 2010, pp. 1-65.
Hidetoshi Shimodaira et al., "Improving Predictive Inference Under Covariate Shift by Weighting the Log-Likelihood Function", Journal of Statistical Planning and Inference, Feb. 25, 2000, pp. 227-244, vol. 90.
Christopher M. Bishop, "Pattern Recognition and Machine Learning" Springer, 2006.

* cited by examiner

*Primary Examiner* — Kakali Chaki
*Assistant Examiner* — Mai T Tran
(74) *Attorney, Agent, or Firm* — Sughrue Mion, PLLC

(57) ABSTRACT

To provide a discriminant model learning device capable of efficiently learning a discriminant model on which domain knowledge indicating user's knowledge or analysis intention for a model is reflected while keeping fitting to data. A query candidate storage means 81 stores candidates of a query as a model to be given with domain knowledge indicating a user's intention. A regularization function generation means 82 generates a regularization function indicating compatibility with domain knowledge based on the domain knowledge to be given to the query candidates. A model learning means 83 learns a discriminant model by optimizing a function defined by a loss function and the regularization function predefined per discriminant model.

9 Claims, 11 Drawing Sheets

DISCRIMINANT MODEL LEARNING DEVICE, METHOD AND PROGRAM

BACKGROUND OF THE INVENTION

1. Field of the Invention

The present invention relates to a discriminant model learning device, a discriminant model learning method and a discriminant model learning program for learning a discriminant model for discriminating data.

2. Description of the Related Art

An important industrial object is to efficiently process a large scale and large amount of data along with recent rapid development of data infrastructure. Particularly, a technique for discriminating which category data belongs to is one of main techniques in many applications such as data mining and pattern recognition.

An example utilizing a data discriminating technique is to make predictions on unclassified data. For example, when a vehicle failure diagnosis is made, sensor data obtained from the vehicle and past failure cases are learned thereby to generate a rule for discriminating failures. Then, the generated rule is applied to the sensor data of the vehicle in which a new failure has occurred (that is, unclassified data), thereby specifying a failure occurring in the vehicle or narrowing (predicting) its causes.

The data discriminating technique is also used for analyzing a difference between categories or factors. For example, when a relationship between a disease and a lifestyle is to be examined, a group to be examined is classified into a group having a disease and a group not having the same, and a rule for discriminating the two groups is only learned. For example, the thus-learned rule is assumed to be "when an object person is obese and a smoker, he/she has a high possibility of a disease." In this case, if both the conditions of "obese" and "smoker" are met, they are suspicious of important factors of the disease.

For the problem on data discrimination, the most important object is how to learn a discriminant model indicating a rule for classifying data from target data. Thus, there are proposed many methods for learning a discriminant model from data which is given with category information based on past cases or simulation data. The methods are learning methods using a discriminant label, and are called "supervised learning." The category information may be denoted as discriminant label in the following. NPTL 1 describes therein exemplary supervised learning such as logistic regression, support vector machine and decision tree.

NPTL 2 describes therein a semi-supervised learning method which supposes a distribution of discriminant labels and makes use of data without discriminant label. NPTL 2 describes therein a Laplacian support vector machine as exemplary semi-supervised learning.

NPLT 3 describes therein a technique called covariate shift or domain adaptation for performing discrimination learning in consideration of a change in data nature.

NPLT 4 describes therein uncertainty which data necessary for learning a discriminant model gives to estimation of a model.

CITATION LIST

Non Patent Literatures

NPTL 1: Christopher Bishop, "Pattern Recognition and Machine Learning", Springer, 2006

NPTL 2: Mikhail Belkin, Partha Niyogi, Vikas Sindhwani, "Manifold Regularization: A Geometric Framework for Learning from Labeled and Unlabeled Examples", Journal of Machine Learning Research (2006), Volume 7, Issue 48, p. 2399-2434

NPTL 3: Hidetoshi Shimodaira, "Improving predictive inference under covariate shift by weighting the log-likelihood function", Journal of Statistical Planning and Inference, 90(2), p. 227-244, October 2000

NPTL 4: Burr Settles, "Active Learning Literature Survey", Computer Sciences Technical Report 1648, University of Wisconsin—Madison, 2010

SUMMARY OF THE INVENTION

The discrimination learning based on supervised learning has the following problems.

The first problem is that with a small amount of data given with discriminant labels, a performance of a model to be learned is significantly deteriorated. The problem is caused by a small amount of data relative to a size of a search space of model parameters, and is caused when the parameters cannot be well optimized.

In the discrimination learning based on supervised learning, a discriminant model is optimized such that a discrimination error by target data is minimized. For example, a log-likelihood function is used for logistic regression, a hinge loss function is used for support vector machine, and an information gain function is used for decision tree. However, the second problem is that a model to be learned does not necessarily match with user's knowledge. The second problem will be described by way of a case in which the discrimination learning is applied to vehicle failure discrimination.

FIG. 12 is an explanatory diagram showing an exemplary method for learning a discriminant model. In the example, it is assumed that as a result of an abnormally heated engine, a failure occurs in the engine and thus an abnormal high frequency component occurs for its rotation. In FIG. 12, data with circle indicates failure data and data with cross indicates normal data.

In the example shown in FIG. 12, two discriminant models are assumed. One is a model (discriminant model 1) for making a discrimination based on an engine temperature as failure cause as classified by the dotted line 91 exemplified in FIG. 12, and the other is a model (discriminant model 2) for making a discrimination based on an engine frequency as a phenomenon as classified by the dotted line 92 exemplified in FIG. 12.

The discriminant model 2 is selected from the discriminant model 1 and the discriminant model 2 exemplified in FIG. 12 in terms of optimization based on whether the engine is broken. This is because when the discriminant model 2 is selected, the groups of normal and abnormal data including data 93 can be completely separated. On the other hand, when the failure discrimination is actually applied, the discriminant model 1, which can make a discrimination with a comparable accuracy and is based on causes, is more preferable than the discriminant model 2 based on phenomena.

The third problem is that a model automatically optimized by data cannot capture a phenomenon not present in data in principle.

The third problem will be described below by way of examples. It is assumed herein that an obesity risk (whether a person becomes obese in the future) is predicted from inspection data of the specific medical checkup. At present, the specific medical checkup is obligated to persons aged of 40 and older in Japan, and thus detailed inspection data is obtained. Therefore, it is possible to learn a discriminant model by use of the inspection data.

On the other hand, the discriminant model may be used to prevent an obesity risk of the younger (such as persons in their twenties). However, in this case, the data nature is different between the data of persons in their twenties and the data of persons aged 40 and older. Thus, even if the discriminant model with the characteristics of the persons in their forties is applied to persons in their twenties, a reliability of the discrimination result is lowered.

In order to solve the first problem, there is considered that a model is learn by semi-supervised learning described in NPTL 2. It is known that when an assumption on the distribution of discriminant labels is correct, the semi-supervised learning is effective also for the first problem. However, the second problem cannot be solved even with the semi-supervised learning.

In the case of typical data analysis, feature extraction or feature selection for previously extracting a feature related to a category is performed in order to solve the second problem. However, when many data features are present, another problem occurs that the processing costs much. Further, the features are extracted based on domain knowledge. However, when the extracted feature does not match with the data, a large reduction in discrimination accuracy is caused.

As described in NPTL 1, there are proposed many machine-based automatic feature selecting methods. The most representative automatic feature selecting methods are discrimination learning such as L1 regularized support vector machine and L1 regularized logistic regression. However, the machine-based automatic feature selecting method selects a feature for optimizing a standard, and thus it cannot solve the second problem.

The method described in NPTL 3 assumes that the data contained in the two groups of data (the data of persons in their twenties and the data of persons aged 40 and older, in the above example) is sufficiently obtained and a difference between the distributions of the two groups of data is relatively small. Particularly, due to the former's restriction, an application of a model to be learned by the method described in NPTL 3 is limited to an application of ex post facto analyzing both groups of sufficiently-collected data.

It is therefore an exemplary object of the present invention to provide a discriminant model learning device, a discriminant model learning method and a discriminant model learning program capable of efficiently learning a discriminant model on which domain knowledge indicating user's knowledge or analysis intention for a model is reflected, while keeping a fitting property to data.

According to the present invention, there is provided a discriminant model learning device including: a query candidate storage means for storing candidates of a query which is a model to be given with domain knowledge indicating a user's intention; a regularization function generation means for generating a regularization function indicating compatibility with domain knowledge based on the domain knowledge given to the query candidates; and a model learning means for learning a discriminant model by optimizing a function defined by a loss function and the regularization function predefined per discriminant model.

According to the present invention, there is provided a discriminant model learning method including the steps of: generating a regularization function indicating compatibility to domain knowledge indicating a user's intention based on the domain knowledge given to candidates of a query which is a model to be given with the domain knowledge; and learning a discriminant model by optimizing a function defined by a loss function and the regularization function predefined per discriminant model.

According to the present invention, there is provided a discriminant model learning program for causing a computer to execute: a regularization function generation processing of generating a regularization function indicating compatibility with domain knowledge indicating a user's intention based on the domain knowledge given to candidates of a query which is a model to be given with the domain knowledge; and a model learning processing of learning a discriminant model by optimizing a function defined by a loss function and the regularization function predefined per discriminant model.

According to the present invention, a discriminant model on which domain knowledge is reflected can be efficiently learned while a fitting property to data is kept.

DETAILED DESCRIPTION OF EMBODIMENTS

In the following description, one item of data is handled as one item of D-dimensional vector data. Data such as text or image, which is not typically in a vector form, is also handled as vector data. In this case, data is converted into a vector indicating the presence of a word in a text (bug of words model) or a vector indicating the presence of a characteristic element in an image (bug of features model), thereby handling the data which is non typically in a vector form as vector data.

The n-th learning data is indicated as $x_n$ and a discriminant label of the n-th learning data $x_n$ is indicated as $y_n$. Data when the number of items of data is N is indicated as $x^N$ (=$x_1, \ldots,$ $x_N$) and a discriminant label when the number of items of data is N is indicated as $y^N$ (=$y_1$, . . . , $y_N$).

At first, a basic principle of discrimination learning will be described. The discrimination learning is to optimize a discriminant model for a function (which is called loss function) for reducing a discrimination error. That is, assuming that the discriminant model is f(x) and an optimized model is f*(x), a learning problem is expressed in Formula 1 by use of the loss function L ($x^N$, $y^N$, f).

$$f^*(x) = \underset{f}{\operatorname{argmin}} L(x^N, y^N, f) \qquad \text{[Formula 1]}$$

Formula 1 is expressed in the form of unconstrained optimization problem, but may be optimized under some constrained condition. For example, in the case of a L1 regularized logistic regression model, when a weight vector w for a feature is defined as f(x)=$w^T$x, Formula 1 is specifically expressed in Formula 2.

$$f^*(x) = w^{*T}x = \underset{f}{\operatorname{argmin}} \sum_{n=1}^{N} \log(1 + \exp(-y_n w^T x)) + \lambda \sum_{d=1}^{D} |w_d| \qquad \text{[Formula 2]}$$

In Formula 2, T indicates transpose of a vector or matrix. The loss function L ($x^N$, $y^N$, f) includes excellent fitting when f(x) is used as a predictive value or probability of y, and a penalty term indicating a complexity of f(x). The addition of the penalty term is called regularization. The regularization is performed in order to prevent a model from over-adapting to data. The over-adaptation of a model to data is also called over-learning. In Formula 2, $\lambda$ is a parameter indicating strength of regularization.

Exemplary supervised-learning will be described below. When data to which a discriminant label is not given is obtained, there may be employed a loss function which is calculated from data to which a discriminant label is given and data to which a discriminant label is not given. The loss function calculated from both the data is employed so that the method described later can be applied to semi-supervised learning.

First Exemplary Embodiment

Figure 1:
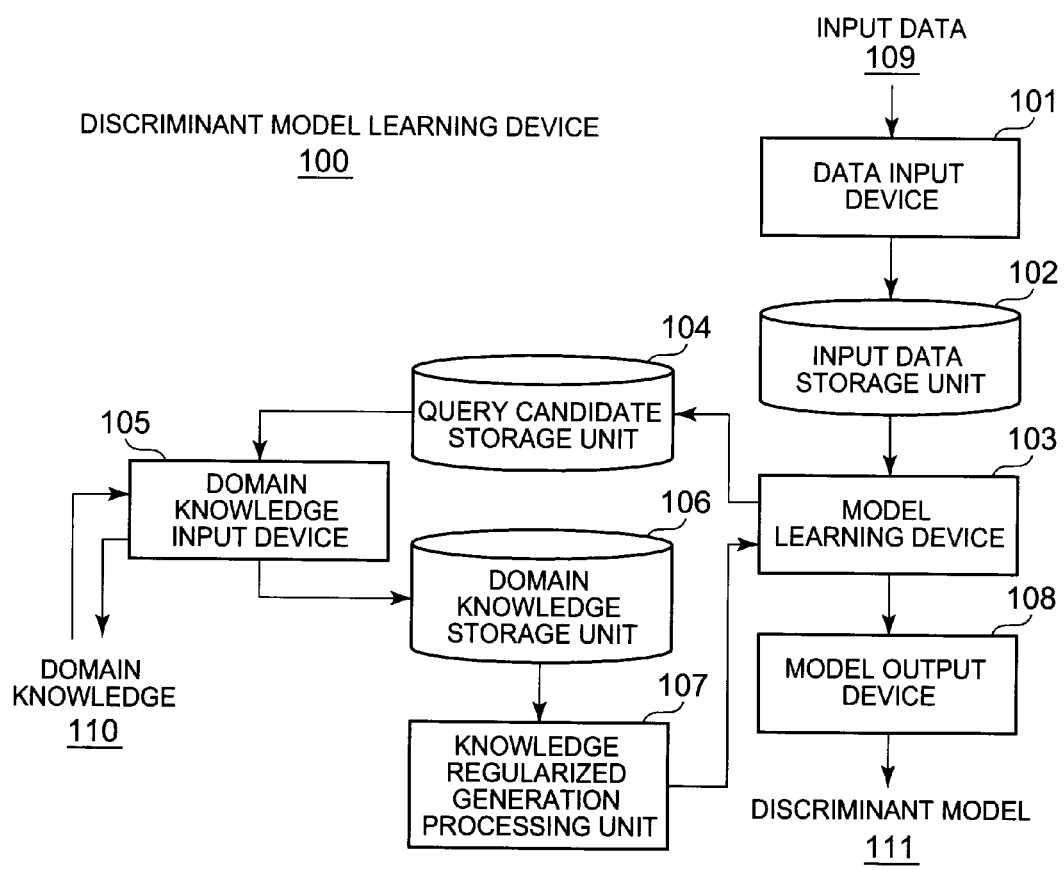
FIG. 1 is a block diagram showing an exemplary structure of a discriminant model learning device according to a first exemplary embodiment of the present invention.

FIG. 1 is a block diagram showing an exemplary structure of a discriminant model learning device according to a first exemplary embodiment of the present invention. The discriminant model learning device 100 according to the present exemplary embodiment comprises an input device 101, an input data storage unit 102, a model learning device 103, a query candidate storage unit 104, a domain knowledge input device 105, a domain knowledge storage unit 106, a knowledge regularized generation processing unit 107, and a model output device 108. Input data 109 and domain knowledge 110 are input into the discriminant model learning device 100 and a discriminant model 111 is output therefrom.

The input device 101 is used for inputting the input data 109. The input device 101 inputs the input data 109 together with parameters necessary for analysis. The input data 109 contains learning data $x^N$ and $y^N$ to which the discriminant label is given, and parameters necessary for analysis. When the data to which a discriminant label is not given is used for semi-supervised learning, the data therefor is also input together.

The input data storage unit 102 stores therein the input data 109 input by the input device 101.

The model learning device 103 learns a discriminant model by solving an optimization problem of a function in which a regularization function calculated by the knowledge regularized generation processing unit 107 described later is added to the loss function L($x^N$, $y^N$, f) previously set (or previously designated as parameters). A specific calculation example will be described along with the following explanation of the knowledge regularized generation processing unit 107.

The query candidate storage unit 104 stores therein candidate models to which domain knowledge is to be previously given. For example, when a linear function f(x)=$w^T$x is used as a discriminant model, the query candidate storage unit 104 stores therein candidate values of w including different values. In the following description, a candidate model to which domain knowledge is to be given may be denoted as query. The query may contain the discriminant model itself learned by the model learning device 103.

The domain knowledge input device 105 comprises an interface for inputting domain knowledge for query candidates. The domain knowledge input device 105 selects a query from the query candidates stored in the query candidate storage unit 104 by any method, and outputs (displays) the selected query candidate. Exemplary domain knowledge to be given to the query candidates will be described below.

[First Exemplary Domain Knowledge]

The first exemplary domain knowledge indicates whether the model candidate is suitable for a final discriminant model. Specifically, when the domain knowledge input device 105 outputs a model candidate, whether the model is suitable for a final discriminant model is input as domain knowledge into the domain knowledge input device 105 by a user or the like. For example, when the discriminant model is a linear function, the domain knowledge input device 105 outputs a candidate value w' of a weight vector of the linear function, and then whether the model matches or how much the model matches is input.

[Second Exemplary Domain Knowledge]

The second exemplary domain knowledge indicates which model is more suitable among model candidates. Specifically, when the domain knowledge input device 105 outputs model candidates, the models are compared with each other by the user or the like, and then which model is more suitable for a final discriminant model is input as domain knowledge. For example, when a discriminant model is a decision tree, the domain knowledge input device 105 outputs two decision tree models f1(x) and f2(x), and then which of f1(x) and f2(x) is more suitable for a discriminant model is input by the user or the like. The example in which two models are compared is described herein, but multiple models may be compared at the same time.

The domain knowledge storage unit 106 stores therein the domain knowledge input into the domain knowledge input device 105.

The knowledge regularized generation processing unit 107 reads the domain knowledge stored in the domain knowledge storage unit 106, and generates a regularization function required in order that the model learning device 103 may optimize a model. That is, the knowledge regularized generation processing unit 107 generates a regularization function based on the domain knowledge given to the query. The regularization function generated here expresses fitting or constraint on the domain knowledge, and is different from a typical loss function used for the supervised learning (or semi-supervised learning) expressing fitting with the data. That is, the regularization function generated by the knowledge regularized generation processing unit 107 may express compatibility with the domain knowledge.

The operations of the model learning device 103 and the knowledge regularized generation processing unit 107 will be further described below. The model learning device 103 optimizes a discriminant model such that both the regularization function generated by the knowledge regularized generation processing unit 107 and the loss function used for the supervised learning (or the semi-supervise learning) indicating fitting (compatibility) with the data are optimized at the same time. This is achieved by solving the optimization problem expressed in Formula 3, for example.

$$f^*(x) = \arg\min_f L(x^N, y^N, f) + KR \quad \text{[Formula 3]}$$

In Formula 3, $L(x^N, y^N, f)$ is a loss function used for typical supervised learning (or semi-supervised learning) explained in Formula 1. In Formula 3, KR is a regularization function and a constrained condition generated by the knowledge regularized generation processing unit 107. The discriminant model is optimized in this way so that the fitting with the data is kept and the model on which the domain knowledge is reflected can be efficiently learned.

In the following description, there will be described a case in which an optimization problem expressed in a sum of the loss function $L(x^N, y^N, f)$ and the regularization function KR is solved as in Formula 3. The target of the optimization problem may be defined in a product of both the functions, or may be defined as a function of both the functions. In either case, optimization is similarly possible. A form of the optimization function is previously defined according to a discriminant model to be learned.

A specific example of the regularization function KR will be described below. The nature of the present invention is to optimize the fitting or constraint of the domain knowledge at the same time with the fitting of the data. The optimization function KR described later is an exemplary function meeting the nature, and other functions meeting the nature can be easily defined.

[First Exemplary Knowledge Regularization]

Like the example described in the first exemplary domain knowledge, it is assumed that the domain knowledge is input as information indicating a model and its excellence (suitability). Herein, pairs of model and its excellence, which are stored in the domain knowledge storage unit 106, are denoted as $(f_1, z_1), (f_2, z_2), \ldots, (f_M, z_M)$, respectively. The example assumes that the regularization function KR is defined as a function having a smaller value as f is more similar to a suitable model or as f is less similar to a non-suitable model.

With the regularization function, if the value of the loss function $L(x_N, y_N, f)$ is comparable therewith in Formula 3, it can be seen that a model more fitted to the domain knowledge is a better model.

When the linear function is used as a discriminant model and the domain knowledge in binary ($z_m = \pm 1$) is given to whether the model is suitable, KR may be defined as Formula 4, for example.

$$KR = \sum_{m=1}^{M} z_m (w - w_m)^2 \quad \text{[Formula 4]}$$

In the example by Formula 4, a similarity between the models is defined by a square distance and the similarity is defined by a coefficient $z_m$ of the square distance. Even when the value $z_m$ indicating the suitability of the model is not binary, the function indicating the similarity between the models and the coefficient determined by $z_m$ are defined so that the regularization function KR can be similarly defined also for a typical discriminant model.

[Second Exemplary Knowledge Regularization]

Like the example described in the second exemplary domain knowledge, it is assumed that the domain knowledge is input as information indicating a comparison between multiple models. The example assumes that for the model $f1 = w_1^T x$ and the model $f2 = w_2^T x$, the domain knowledge indicating that the model f1 is more suitable than the model f2 is input. In this case, KR can be defined as Formula 5, for example.

$$KR = \xi_{12}$$

$$\text{subject to } (w-w_1)^2 \leq (w-w_2)^2 + \xi_{12}, \xi_{12} \geq 0 \quad \text{[Formula 5]}$$

With Formula 5, it can be seen that when the value of the loss function $L(x^N, y^N, f1)$ of the model f1 is comparable with the value of the loss function $L(x^N, y^N, f2)$ of the model f2, f1 at which the value of the regularization function is smaller is correctly optimized as a more suitable model.

The model output device 108 outputs the discriminant model 111 learned by the model learning device 103.

The model learning device 103 and the knowledge regularized generation processing unit 107 are realized by a CPU in a computer operating according to a program (a discriminant model learning program). For example, the program is stored in a storage unit (not shown) in the discriminant model learning device 100, and the CPU may read the program and operate as the model learning device 103 and the knowledge regularized generation processing unit 107 according to the program. The model learning device 103 and the knowledge regularized generation processing unit 107 may be realized in dedicated hardware, respectively.

The input data storage unit 102, the query candidate storage unit 104 and the domain knowledge storage unit 106 are realized by a magnetic disk, for example. The data input device 101 is realized by an interface for receiving data transmitted from a keyboard or other devices (not shown). The model output device 108 is realized by a CPU for storing data in a storage unit (not shown) storing discriminant models therein, or a display device for displaying a discriminant model learning result thereon.

Figure 2:
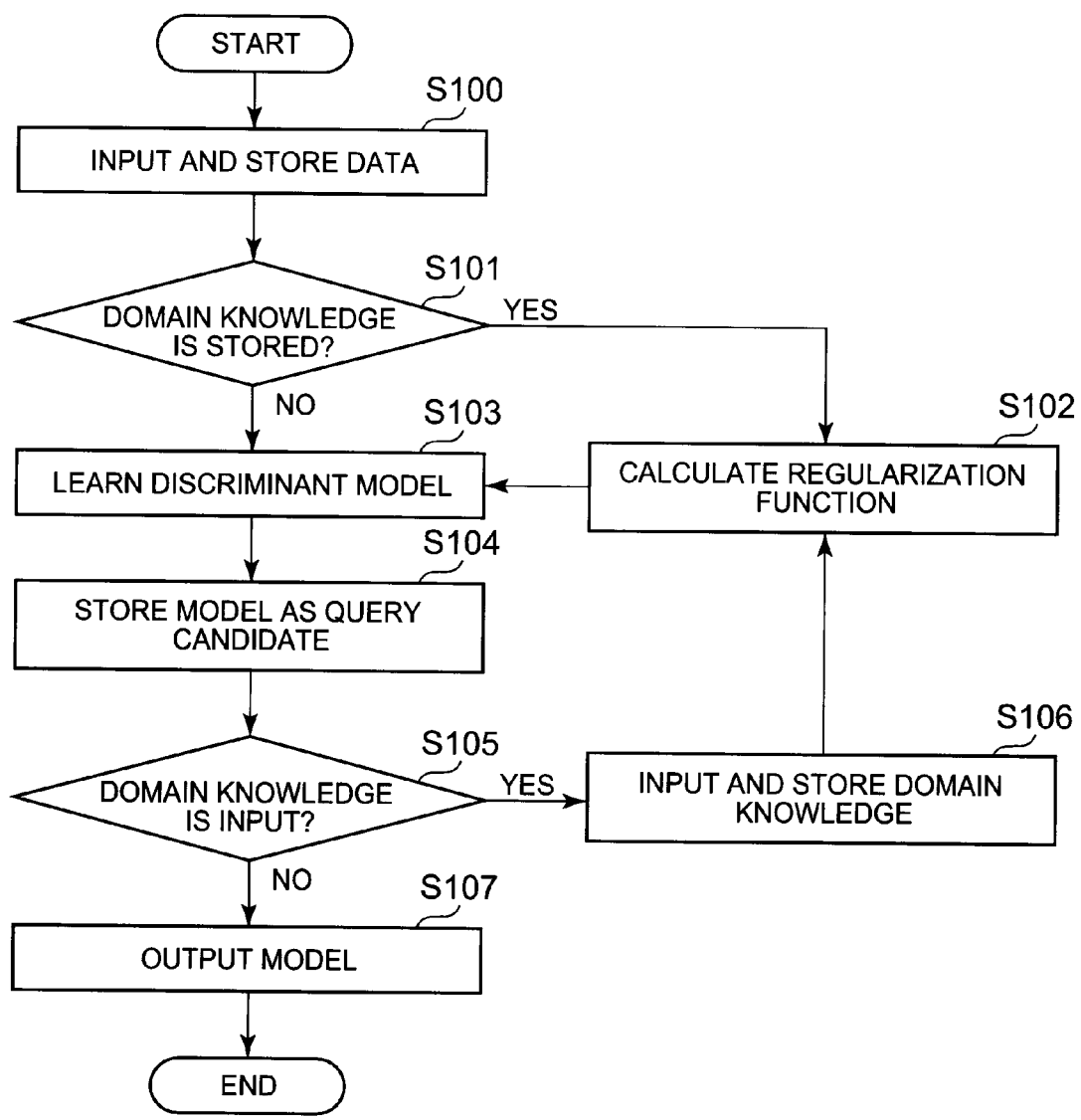
FIG. 2 is a flowchart showing exemplary operations of the discriminant model learning device according to the first exemplary embodiment.

The operations of the discriminant model learning device 100 according to the first exemplary embodiment will be described below. FIG. 2 is a flowchart showing exemplary operations of the discriminant model learning device 100 according to the present exemplary embodiment. At first, the input device 101 stores the input data 109 in the input data storage unit 102 (step S100).

The knowledge regularized generation processing unit 107 confirms whether the domain knowledge is stored in the domain knowledge storage unit 106 (step S101). When the domain knowledge is stored in the domain knowledge storage unit 106 (Yes in step S101), the knowledge regularized generation processing unit 107 calculates a regularization function (step S102). On the other hand, when the domain knowledge is not stored (No in step S101) or after a regularization function is calculated, the processings in step S103 and subsequent steps are performed.

Then, the model learning device 103 learns a discriminant model (step S103). Specifically, when a regularization function is calculated in step S102, the model learning device 103 uses the calculated regularization function to learn a discriminant model. On the other hand, when it is determined in step S101 that the domain knowledge is not stored in the domain knowledge storage unit 106, the model learning device 103 learns a typical discriminant model not by use of the regularization function. Then, the model learning device 103 stores the learned discriminant model as a query candidate in the query candidate storage unit 104 (step S104).

Then, a determination is made as to whether to input the domain knowledge (step S105). The determination processing may be performed based on whether an instruction is made by the user or the like, or may be performed under the condition that a new query candidate is stored in the query candidate storage unit 104. Whether to input the domain knowledge is not limited to the contents.

When it is determined in step S105 that the domain knowledge is to be input (Yes in step S105), the domain knowledge input device 105 reads and outputs the information indicating a query candidate to which the domain knowledge is to be added from the query candidate storage unit 104. When being input with the domain knowledge 110 by the user or the like, for example, the domain knowledge input device 105 stores the input domain knowledge in the domain knowledge storage unit 106 (step S106). When the domain knowledge is input, it is repeated from step S102 of the processing which calculate the regularization function to step S106 of processing which the domain knowledge is input.

On the other hand, when it is determined in step S105 that the domain knowledge is not to be input (No in step S105), the model output device 108 determines that the domain knowledge is completely input, outputs the discriminant model 111 (step S107), and terminates the processing.

As described above, according to the present exemplary embodiment, the knowledge regularized generation processing unit 107 generates a regularization function based on the domain knowledge given to the query candidate, and the model learning device 103 optimizes a function defined by use of the loss function and the regularization function predefined per discriminant model, thereby learning a discriminant model. Thus, the fitting with the data is kept and the discriminant model on which the domain knowledge is reflected can be efficiently learned.

That is, the discriminant model learning device according to the present exemplary embodiment reflects the domain knowledge on the learning of the discriminant model, thereby obtaining a discriminant model matching with the domain knowledge. Specifically, the discrimination accuracy for the data and the regularization condition generated based on the user's knowledge or intention are optimized at the same time, thereby reflecting the domain knowledge and learning a discriminant model having a high accuracy. With the discriminant model learning device according to the present exemplary embodiment, knowledge or intention for the model is input, and thus the domain knowledge can be more efficiently reflected on the discriminant model than features are individually extracted.

Second Exemplary Embodiment

A discriminant model learning device according to a second exemplary embodiment of the present invention will be described below. The discriminant model learning device according to the present exemplary embodiment is different from the first exemplary embodiment in that a model preference described later is learned from domain knowledge input for the model, thereby generating a regularization function.

Figure 3:
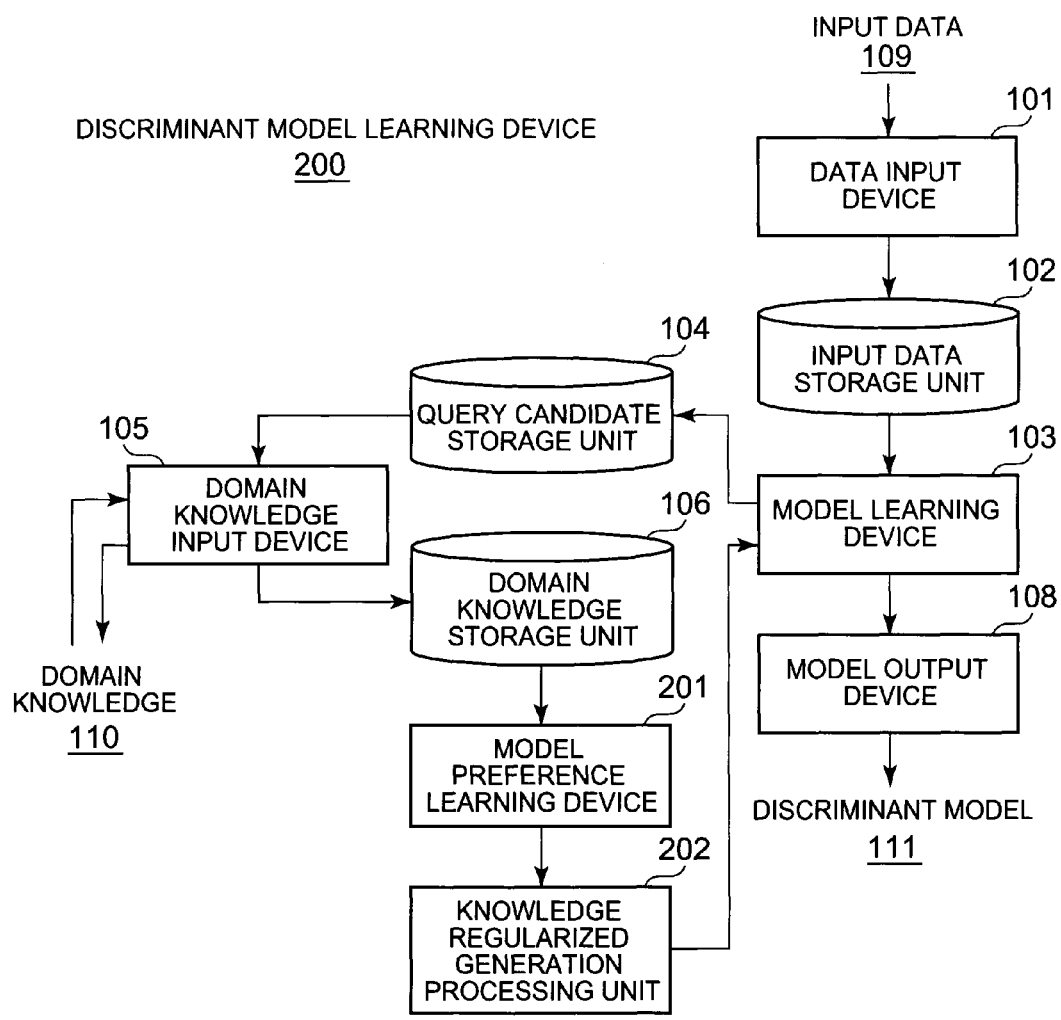
FIG. 3 is a block diagram showing an exemplary structure of a discriminant model learning device according to a second exemplary embodiment of the present invention.

FIG. 3 is a block diagram showing an exemplary structure of the discriminant model learning device according to the second exemplary embodiment of the present invention. The discriminant model learning device 200 according to the present exemplary embodiment is different from the first exemplary embodiment in that the discriminant model learning device includes a model preference learning device 201 and the knowledge regularized generation processing unit 107 is replaced with a knowledge regularized generation processing unit 202. The same constituents as those in the first exemplary embodiment are denoted with the same numerals as those in FIG. 1, and an explanation thereof will be omitted.

In the first exemplary embodiment, the domain knowledge is input to be used as a regularization term, thereby efficiently realizing both the fitting to the data and the reflection of the domain knowledge. On the other hand, much domain knowledge needs to be input in order to realize proper regularization.

Thus, the discriminant model learning device 200 according to the second exemplary embodiment learns a function (which will be denoted as model preference) indicating domain knowledge based on the input domain knowledge. Then, the model preference learned by the discriminant model learning device 200 is used for regularization, thereby appropriately generating a regularization function even when less domain knowledge is input.

The model preference learning device 201 learns a model preference based on the domain knowledge. Subsequently, the model preference is denoted as function g (f) of the model f. For example, when the domain knowledge indicating whether the model is suitable is given in binary, the model preference learning device 201 can learn g (f) as logistic regression model or support vector machine discriminant model.

The knowledge regularized generation processing unit 202 uses the learned model preference to generate a regularization function. The regularization function is configured as an arbitrary function which is more optimum as the value of the model preference function g(f) is larger (that is, as the model f is estimated to be better).

For example, it is assumed that the model f is defined by the linear function $f(x)=w^T x$ and the function g is defined by the linear function $g(f)=v^T w$. Herein, v is a weight function of the model preference, and is a parameter optimized by the model preference learning device 201. In this case, the regularization function RK can be defined as $RK=\log(1+\exp(-g(f)))$, for example.

The model preference learning device 201 and the knowledge regularized generation processing unit 202 are realized by a CPU in a computer operating according to a program (a discriminant model learning program). The model preference learning device 201 and the knowledge regularized generation processing unit 202 may be realized in dedicated hardware, respectively.

Figure 4:
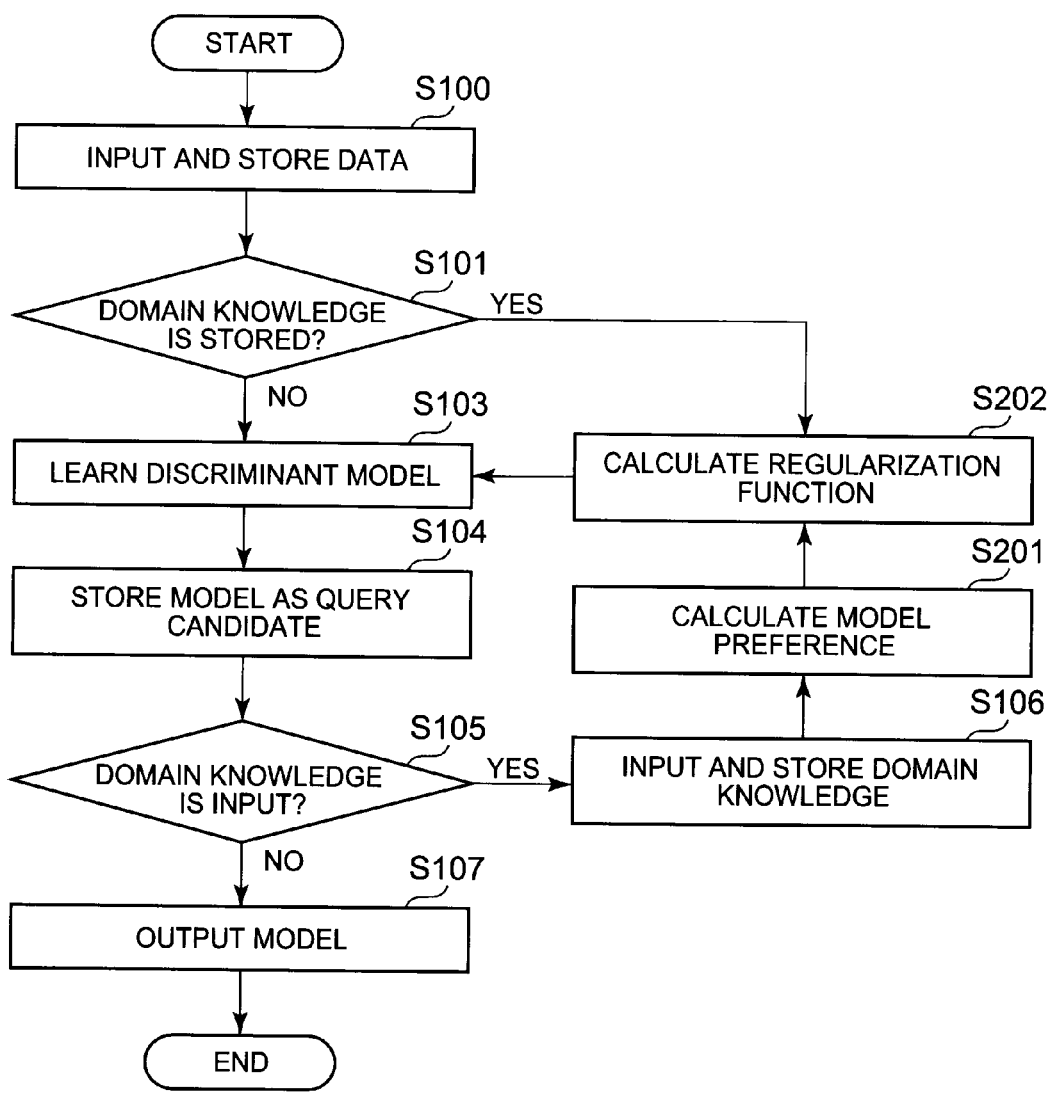
FIG. 4 is a flowchart showing exemplary operations of the discriminant model learning device according to the second exemplary embodiment.

The operations of the discriminant model learning device 200 according to the second exemplary embodiment will be described below. FIG. 4 is a flowchart showing exemplary operations of the discriminant model learning device 200 according to the present exemplary embodiment. The processings from step S100 to step S106 until the domain knowledge is input after the input data 109 is input and the generated discriminant model is stored in the query candidate storage unit 104 are the same as the processings exemplified in FIG. 2.

The model preference learning device 201 learns a model preference based on the domain knowledge stored in the domain knowledge storage unit 106 (step S201). Then, the knowledge regularized generation processing unit 202 uses the learned model preference to generate a regularization function (step S202).

As described above, according to the present exemplary embodiment, the model preference learning device 201 learns a model preference based on domain knowledge, and the knowledge regularized generation processing unit 202 uses the learned model preference to generate a regularization function. Thus, in addition to the effects of the first exemplary embodiment, the regularization function can be properly generated even when less domain knowledge is input.

Third Exemplary Embodiment

A discriminant model learning device according to a third exemplary embodiment of the present invention will be described below. In the present exemplary embodiment, a query candidate creating method is devised so that a user can efficiently input domain knowledge.

Figure 5:
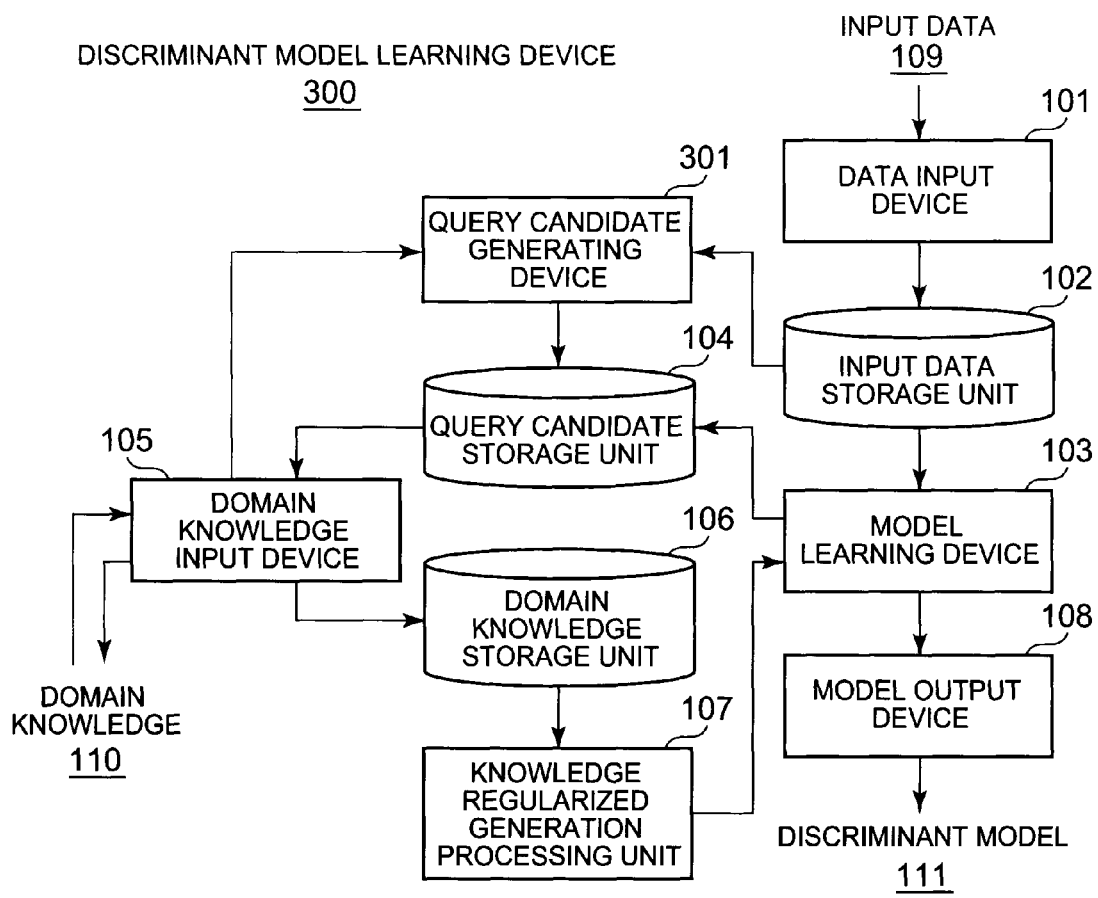
FIG. 5 is a block diagram showing an exemplary structure of a discriminant model learning device according to a third exemplary embodiment of the present invention.

FIG. 5 is a block diagram showing an exemplary structure of the discriminant model learning device according to the third exemplary embodiment of the present invention. The discriminant model learning device 300 according to the present exemplary embodiment is different from the first exemplary embodiment in that a query candidate generating device 301 is included. The same constituents as those in the first exemplary embodiment are denoted with the same numerals as those in FIG. 1, and an explanation thereof will be omitted.

In the first exemplary embodiment and the second exemplary embodiment, domain knowledge is given to the query candidates stored in the query candidate storage unit 104 and a regularization term generated based on the given domain knowledge is used for learning a discriminant model, thereby efficiently achieving both the fitting to data and the reflection of the domain knowledge. In this case, it is assumed that the query candidates are properly generated.

In the present exemplary embodiment, there will be described a method for, when proper query candidates are not stored in the query candidate storage unit 104, restricting an increase in cost for obtaining the domain knowledge and the need of inputting much domain knowledge.

The query candidate generating device 301 generates a query candidate meeting at least one of two natures described later, and stores it in the query candidate storage unit 104. The first nature is that who has input the domain knowledge can understand the model. The second nature is that a discrimination performance is not significantly low in the query candidates.

When the query candidate generating device 301 generates a query candidate to meet the first nature, there is an effect that cost for obtaining the domain knowledge is lowered for the query candidate. An exemplary problem that cost for obtaining the domain knowledge increases will be described by way of a linear discriminant model.

$f(x)=w^T x$ is typically expressed as a D-dimensional linear combination. It is assumed herein that 100-dimensional data (D=100) is inquired with a candidate value w' of a weight vector of a model as a query. In this case, who has input the domain knowledge needs to confirm w' of the 100-dimensional vector, and thus the cost for inputting the domain knowledge increases.

Typically, whether the discriminant model is linear or non-linear such as decision tree, the model can be easily confirmed with less input features used for the model. In this case, the cost for inputting the domain knowledge can be lowered. That is, who has input the domain knowledge can understand the model.

The query candidate generating device 301 generates query candidates meeting the first nature (or query candidates in which the domain knowledge given by the user is reduced) in the following two procedures. For the first procedure, the query candidate generating device 301 lists a small number of combinations of input features among D-dimensional input features in the input data by an arbitrary method. At this time, the query candidate generating device 301 does not need to list all the combinations of features, and may list a desired number of features to be generated as query candidates. The query candidate generating device 301 extracts only two features from the D-dimensional features, for example.

Then, for the second procedure, the query candidate generating device 301 learns query candidates using only a small number of input features for each of the listed combinations. At this time, the query candidate generating device 301 can use an arbitrary method as a query candidate learning method. The query candidate generating device 301 may learn the query candidates by use of the same method as the method in which the model learning device 103 excludes the regularization function KR to learn a discriminant model, for example.

The second nature will be described below. When the query candidate generating device 301 generates query candidates to meet the second nature, there is an effect that unwanted query candidates are excluded to reduce the number of inputs of the domain knowledge.

The model learning device according to the present invention optimizes a discriminant model in consideration of the domain knowledge and the fitting to the data at the same time. Thus, when the optimization problem expressed in Formula 3 is optimized, for example, the fitting to the data (the loss function $L(x^N, y^N, f)$) is also optimized and thus a model having a low discrimination accuracy is not selected. Therefore, even when the domain knowledge is given to query candidates with the models having a significantly low discrimination accuracy as the query candidates, the queries are outside the model search space and thus are unwanted.

The query candidate generating device 301 generates query candidates meeting the second nature (or query candidates in which queries having a significantly low discrimination accuracy are deleted from multiple queries) in the following two procedures. At first, for the first procedure, a plurality of query candidates are generated by an arbitrary method. The query candidate generating device 301 may generate the query candidates by use of the same method as the method for generating the query candidates meeting the first nature, for example.

For the second procedure, the query candidate generating device 301 calculates a discrimination accuracy of the generated query candidates. The query candidate generating device 301 determines whether the accuracy of the query candidates is significantly low, and deletes the queries determined to have a significantly low accuracy from the query candidates. The query candidate generating device 301 may determine the significance by calculating a degree of deterioration of the accuracy from the models in the query candidates having the highest accuracy, for example, and comparing the degree with a preset threshold (or a threshold calculated from the data).

In this way, in the present exemplary embodiment, proper query candidates are generated by the query candidate generating device. Thus, the model learning device 103 may or may not store the learned discriminant model in the query candidate storage unit 104.

The query candidate generating device 301 is realized by a CPU in a computer operating according to a program (a discriminant model learning program). The query candidate generating device 301 may be realized in dedicated hardware.

Figure 6:
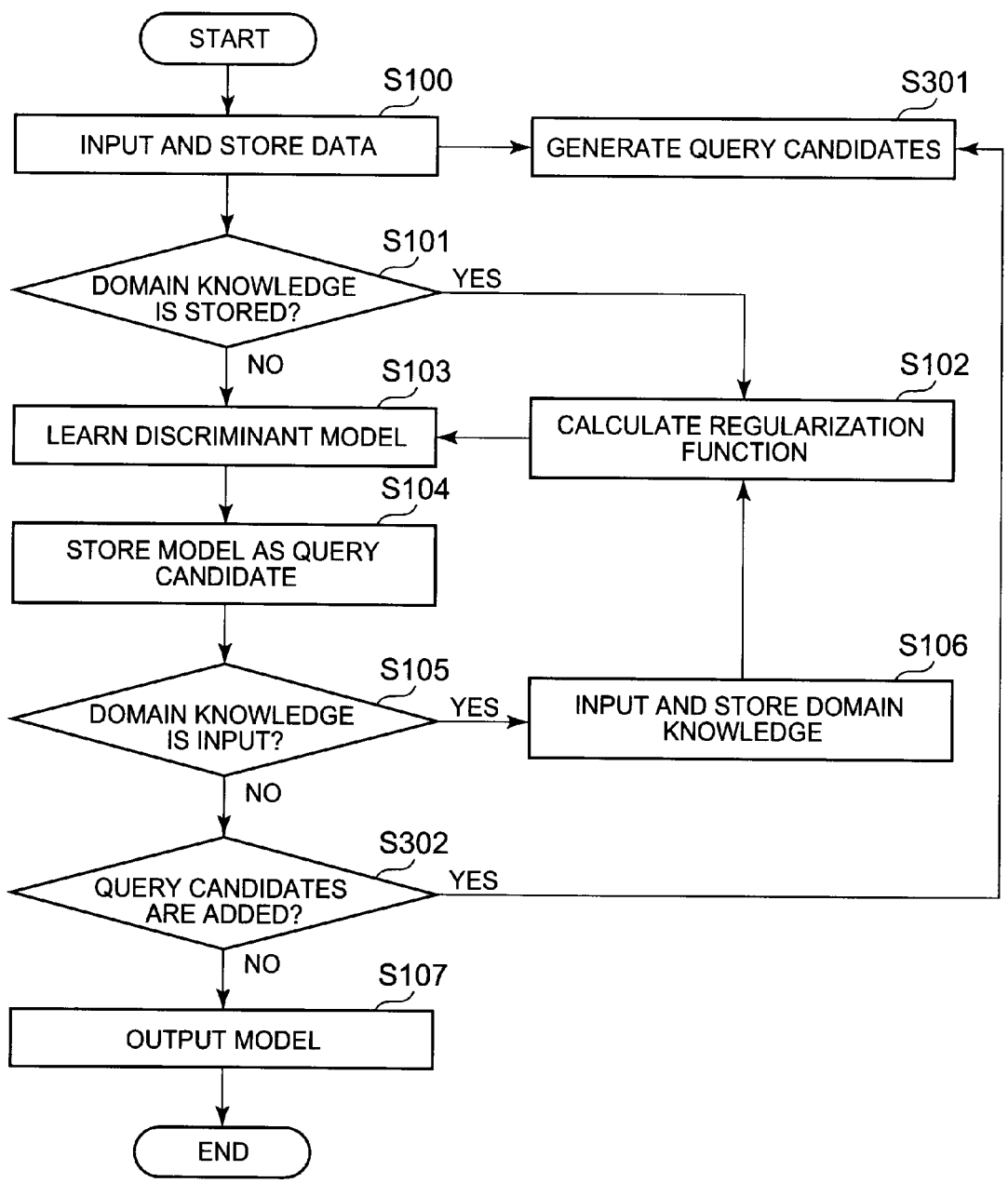
FIG. 6 is a flowchart showing exemplary operations of the discriminant model learning device according to the third exemplary embodiment.

The operations of the discriminant model learning device 300 according to the third exemplary embodiment will be described below. FIG. 6 is a flowchart showing exemplary operations of the discriminant model learning device 300 according to the present exemplary embodiment. In the flowchart exemplified in FIG. 6, the processings described in the flowchart exemplified in FIG. 2 are added with the processing in step S301 of generating query candidates based on the input data and the processing in step S302 of determining whether to add query candidates at the processing termination determination.

Specifically, when the input device 101 stores the input data 109 in the input data storage unit 102 (step S100), the query candidate generating device 301 uses the input data 109 to generate query candidates (step S301). The generated query candidates are stored in the query candidate storage unit 104.

When it is determined in step S105 that the domain knowledge is not to be input (No in step S105), the query candidate generating device 301 determines whether to add the query candidates (step S302). The query candidate generating device 301 may determine whether to add the query candidates in response to a user's instruction or the like, or may determine whether to add the query candidates based on whether a predetermined number of queries have been generated, for example.

When it is determined that the query candidates are to be added (Yes in step S302), the query candidate generating device 301 repeats the processing in step S301 of generating query candidates. On the other hand, it is determined that the query candidates are not to be added (No in step S302), the model output device 108 determines that the domain knowledge is completely input, outputs the discriminant model 111 (step S107), and terminates the processing.

As described above, according to the present exemplary embodiment, proper query candidates are generated by the query candidate generating device. Thus, the processing in step S104 exemplified in FIG. 6 (or the processing of storing the learned discriminant model in the query candidate storage unit 104) may or may not be performed.

As described above, according to the present exemplary embodiment, the query candidate generating device 301 generates query candidates in which the domain knowledge given by the inputting person is reduced or query candidates in which queries having a significantly low discrimination accuracy are deleted from a plurality of queries. Specifically, the query candidate generating device 301 extracts a predetermined number of features from the features indicating the input data, and generates query candidates from the extracted features. Alternatively, the query candidate generating device 301 calculates a discrimination accuracy of the query candidates, and deletes queries whose calculated discrimination accuracy is significantly low from the query candidates.

Thus, in addition to the effects of the first exemplary embodiment and the second exemplary embodiment, there is an effect that even when proper query candidates are not present, an increase in cost for obtaining the domain knowledge or the need of inputting much domain knowledge can be restricted.

Fourth Exemplary Embodiment

A discriminant model learning device according to a fourth exemplary embodiment of the present invention will be described below. In the present exemplary embodiment, query candidates given with domain knowledge (or queries input by the user) are optimized so that the user can efficiently input the domain knowledge.

Figure 7:
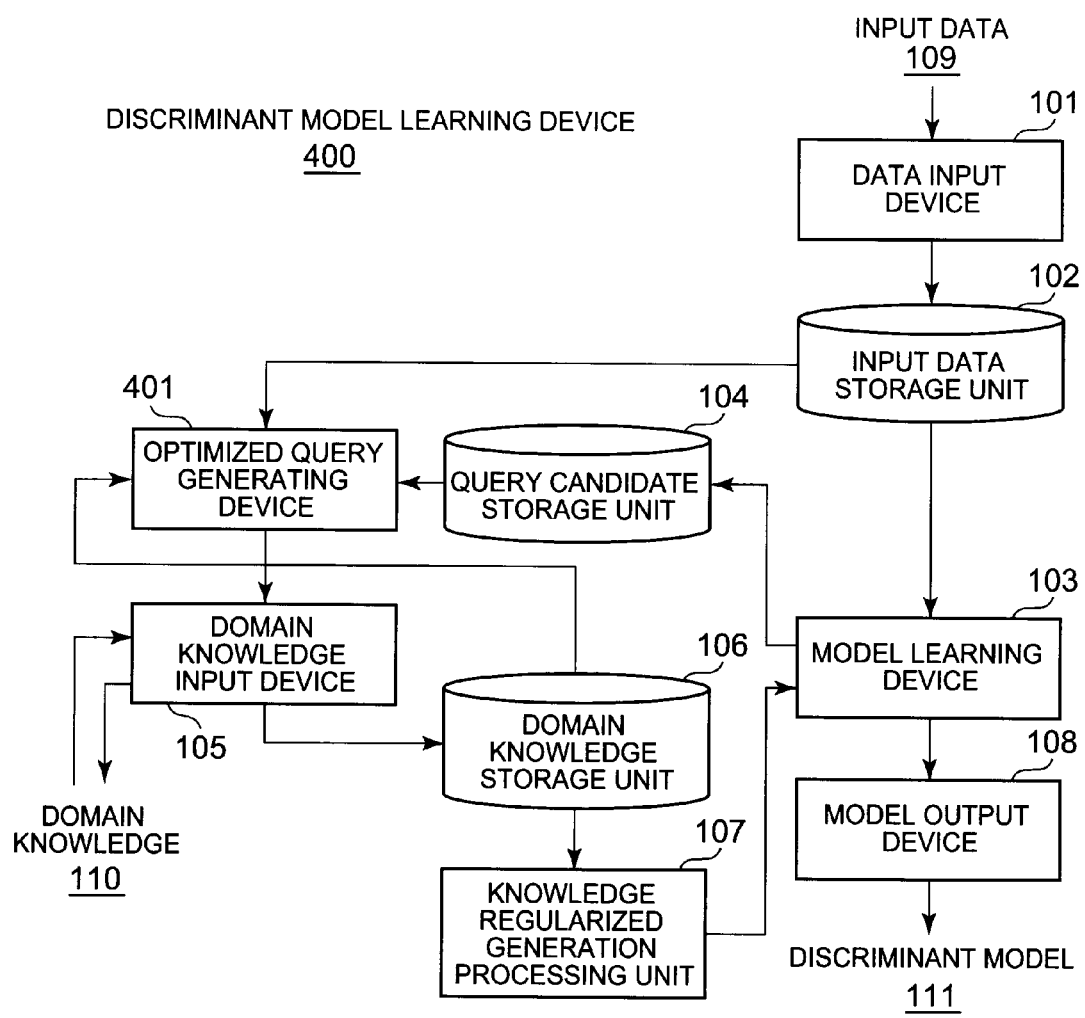
FIG. 7 is a block diagram showing an exemplary structure of a discriminant model learning device according to a fourth exemplary embodiment of the present invention.

FIG. 7 is a block diagram showing an exemplary structure of the discriminant model learning device according to the fourth exemplary embodiment of the present invention. The discriminant model learning device 400 according to the present exemplary embodiment is different from the first exemplary embodiment in that an optimized query generating device 401 is included. The same constituents as those in the first exemplary embodiment are denoted with the same numerals as those in FIG. 1, and an explanation thereof will be omitted.

In the first to third exemplary embodiments, the domain knowledge input device 105 selects query candidates to be added with the domain knowledge from the query candidate storage unit 104 in an arbitrary method. However, in order to more efficiently input the domain knowledge, the most appropriate queries need to be selected by some standard from the query candidates stored in the query candidate storage unit 104.

Thus, the optimized query generating device 401 selects and outputs a collection of queries having the minimum uncertainty of the discriminant model learned by the queries from the query candidate storage unit 104.

Figure 8:
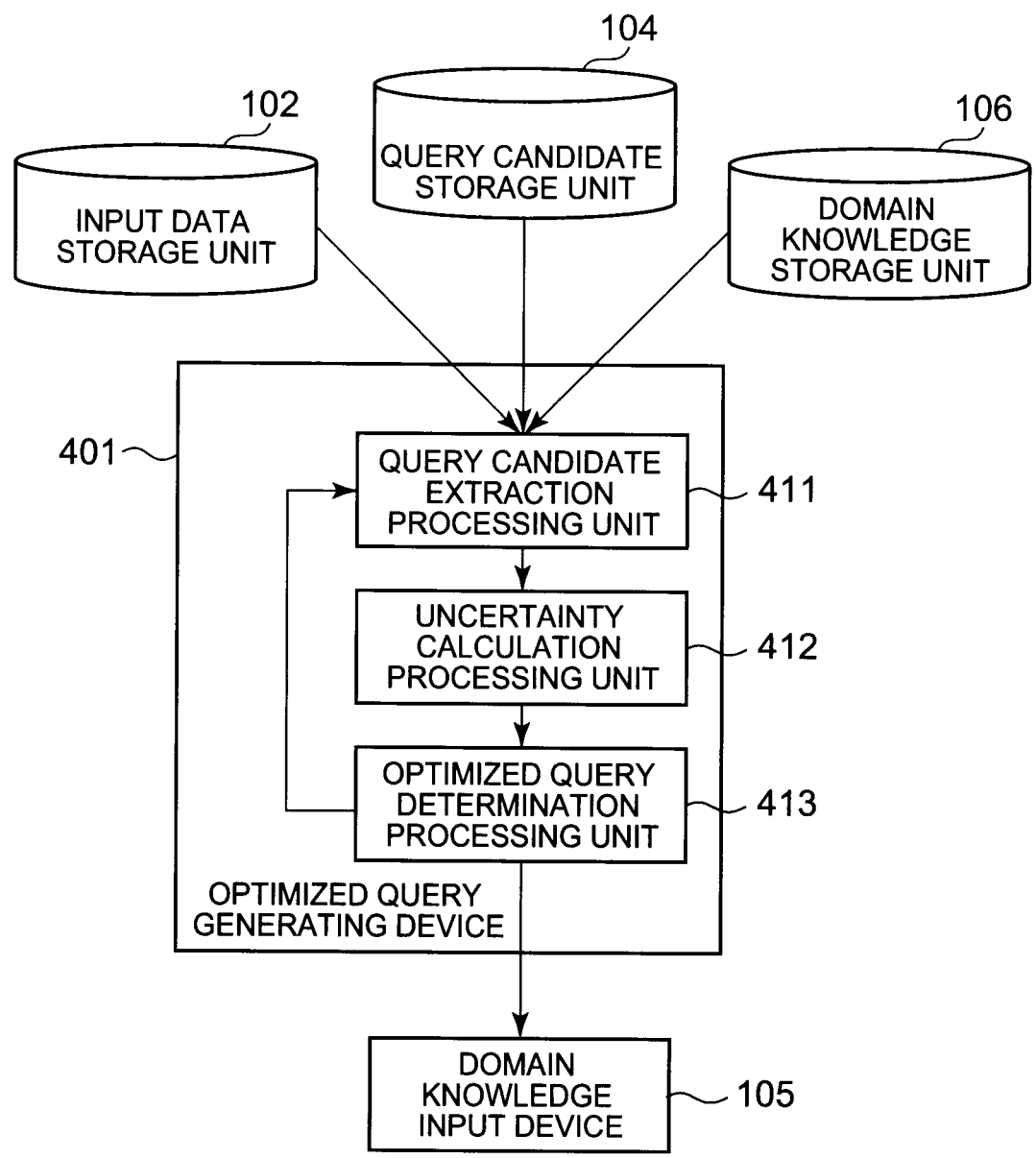
FIG. 8 is a block diagram showing an exemplary structure of an optimized query generating device.

FIG. 8 is a block diagram showing an exemplary structure of the optimized query generating device 401. The optimized query generating device 401 includes a query candidate extraction processing unit 411, an uncertainty calculation processing unit 412, and an optimized query determination processing unit 413.

The query candidate extraction processing unit 411 extracts one or more query candidates which are stored in the query candidate storage unit 104 and are not given with the domain knowledge by an arbitrary method. For example, when one model to be added with the domain knowledge is output as a query candidate, the query candidate extraction processing unit 411 may extract the candidates stored in the query candidate storage unit 104 one by one.

For example, when two or more models to be added with the domain knowledge are output as query candidates, the query candidate extraction processing unit 411 may extract all the combination candidates in turns similar to the one-by-one output. The query candidate extraction processing unit 411 may extract combination candidates by use of any search algorithm. The models corresponding to the extracted query candidates are assumed as f'1 to f'K below. K indicates the number of extracted query candidates.

The uncertainty calculation processing unit 412 calculates uncertainty of the models when the domain knowledge is given to f'1 to f'K. The uncertainty calculation processing unit 412 can use any index indicating how uncertain the estimation of the models is, as the uncertainty of the models. For example, the third chapter of "Query Strategy Frameworks" in NPLT 4 describes therein various indexes such as "least confidence", "margin sampling measure", "entropy", "vote entropy", "average Kulback-Leibler divergence", "expected model change", "expected error", "model variance" and "Fisher information score." The uncertainty calculation processing unit 412 may use the indexes as uncertainty indexes. The uncertainty indexes are not limited to the indexes described in NPLT 4.

An uncertainty evaluating method described in NPLT 4 evaluates uncertainty which the data necessary for learning a discriminant model gives to the estimation of the model. On the other hand, the present exemplary embodiment is essentially different from other exemplary embodiments in that uncertainty which the query candidates give to the estimation of the models is evaluated by inquiring excellence of the model itself and obtaining the domain knowledge.

The optimized query determination processing unit 413 selects query candidates having the highest uncertainty or a collection of candidates (or two or more query candidates) having high certainty. Then, the optimized query determination processing unit 413 inputs the selected query candidates into the domain knowledge input device 105.

The optimized query generating device 401 (more specifically, the query candidate extraction processing unit 411, the uncertainty calculation processing unit 412, and the optimized query determination processing unit 413) is realized by a CPU in a computer operating according to a program (a discriminant model learning program). The optimized query generating device 401 (more specifically, the query candidate extraction processing unit 411, the uncertainty calculation processing unit 412, and the optimized query determination processing unit 413) may be realized in dedicated hardware.

Figure 9:
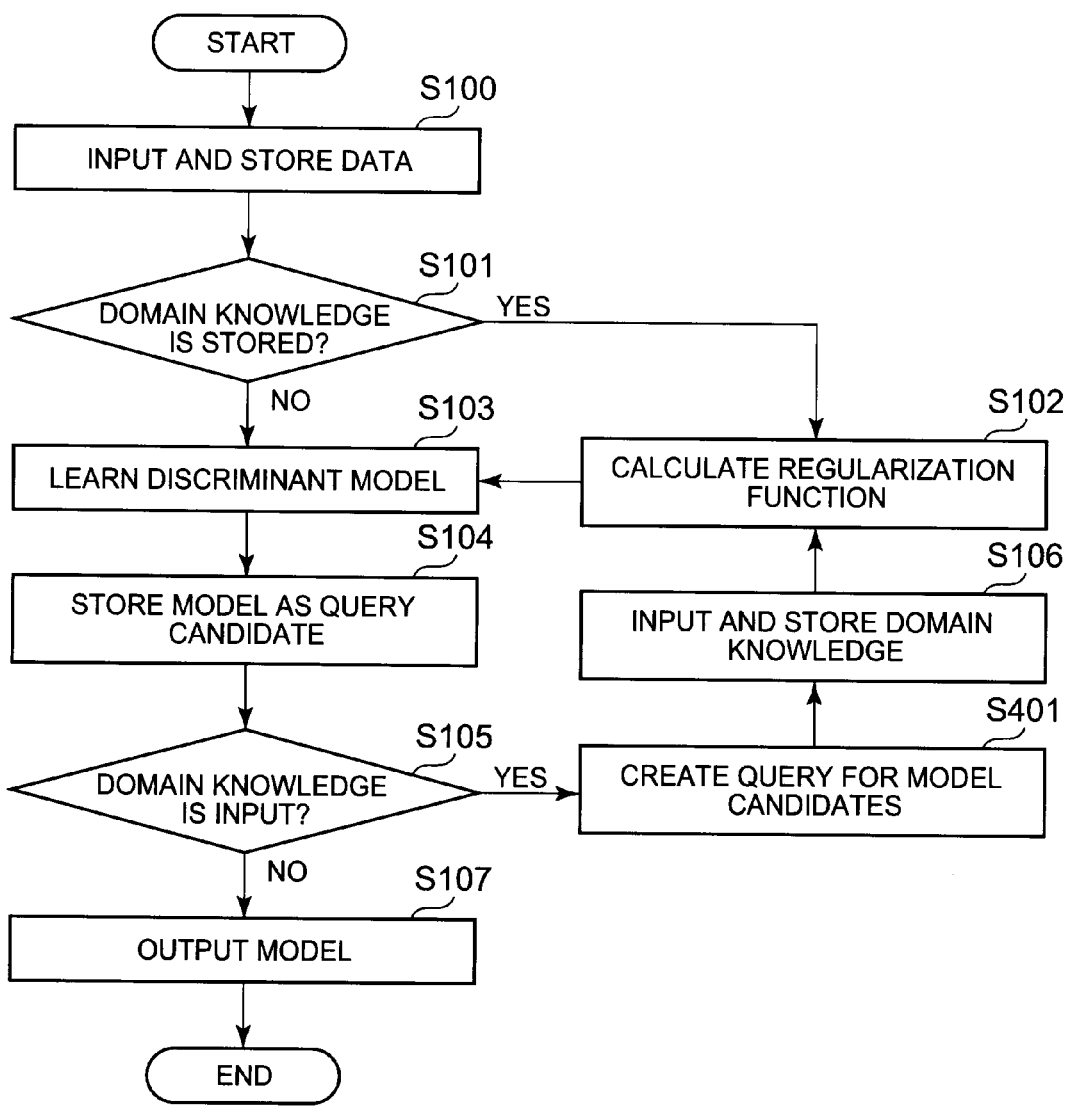
FIG. 9 is a flowchart showing exemplary operations of the discriminant model learning device according to the fourth exemplary embodiment.

The operations of the discriminant model learning device 400 according to the fourth exemplary embodiment will be described below. FIG. 9 is a flowchart showing exemplary operations of the discriminant model learning device 400 according to the present exemplary embodiment. In the flowchart exemplified in FIG. 9, the processings described in the flowchart exemplified in FIG. 2 are added with the processing in step S401 of generating a query for model candidates.

Specifically, when it is determined in step S105 that the domain knowledge is to be input (Yes in step S105), the optimized generating device 401 generates a query for model candidates (step S401). That is, the optimized query generating device 401 generates query candidates to which the user or the like gives the domain knowledge.

Figure 10:
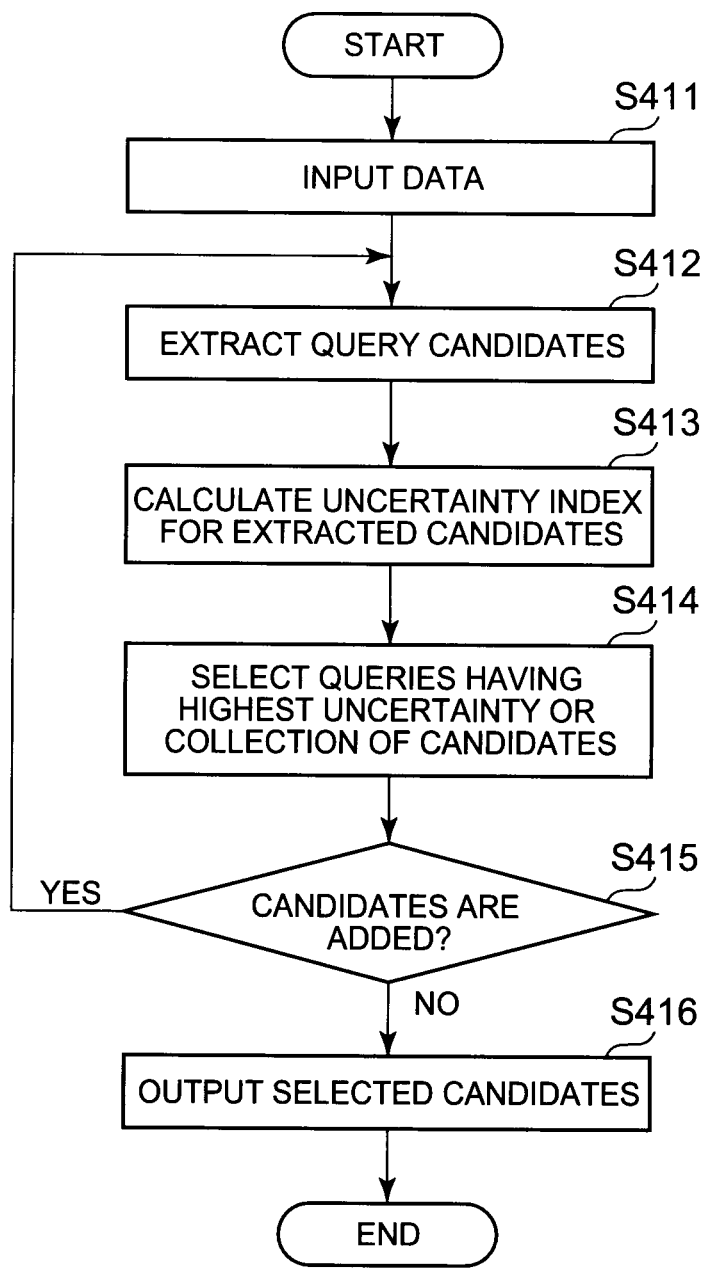
FIG. 10 is a flowchart showing exemplary operations of the optimized query generating device.

FIG. 10 is a flowchart showing exemplary operations of the optimized query generating device 401. The query candidate extraction processing unit 411 inputs data stored in the input data storage unit 102, the query candidate storage unit 104 and the domain knowledge storage unit 106, respectively (step S411), and extracts query candidates (step S412).

The uncertainty calculation processing unit 412 calculates an index indicating uncertainty per extracted query candidate (step S413). The optimized query determination processing unit 413 selects query candidates having the highest uncertainty or a collection of query candidates (two or more query candidates, for example) (step S414).

The optimized query determination processing unit 413 determines whether to further add query candidates (step S415). When it is determined that query candidates are to be added (Yes in step S415), the processings in step S412 and subsequent steps are repeated. On the other hand, when it is determined that query candidates are not to be added (No in step S415), the optimized query determination processing unit 413 outputs the selected candidates together to the domain knowledge input device 105 (step S416).

As described above, according to the present exemplary embodiment, the optimized query generating device 401 extracts, from the query candidates, queries having low uncertainty of the learned discriminant model when the domain knowledge is given thereto. In other words, when the domain knowledge is given to the queries, the optimized query generating device 401 extracts queries having low uncertainty of the discriminant model estimated by use of the queries given with the domain knowledge, from the query candidates.

Specifically, the optimized query generating device 401 extracts queries having the highest uncertainty of the learned discriminant model, or a predetermined number of queries in descending order of uncertainty, from the query candidates. This is because the domain knowledge is given to the queries having high uncertainty so that uncertainty of the discriminant model to be learned is small.

Thus, when the discriminant model on which the domain knowledge is reflected is generated, optimum queries to be given with the domain knowledge can be generated. Thus, the optimum queries are extracted in this way so that the domain knowledge input device 105 can receive the input of the domain knowledge from the user for the queries extracted by the optimized query generating device 401. Therefore, the domain knowledge is given to the query candidates having high uncertainty so that an accuracy in estimating the regularization term based on the domain knowledge can be enhanced and consequently an accuracy of the discrimination learning can be enhanced.

The discriminant model learning device 200 according to the second exemplary embodiment and the discriminant model learning device 400 according to the fourth exemplary embodiment may comprise the query candidate generating device 301 provided in the discriminant model learning device 300 according to the third exemplary embodiment in order to generate query candidates from the input data 109. The discriminant model learning device 400 according to the fourth exemplary embodiment may comprise the model preference learning device 201 according to the second exemplary embodiment. In this case, the discriminant model learning device 400 can generate a model preference, and thus a regularization function can be calculated by use of a model preference also in the fourth exemplary embodiment.

Figure 11:
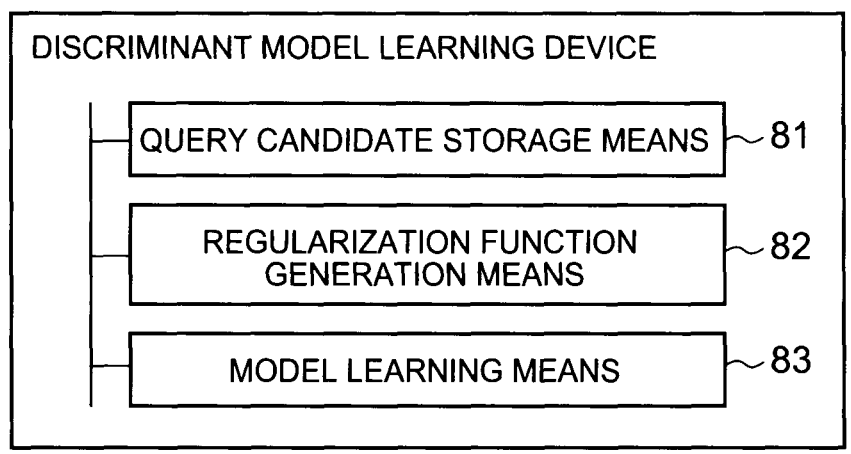
FIG. 11 is a block diagram showing the outline of a discriminant model learning device according to the present invention.
Figure 12:
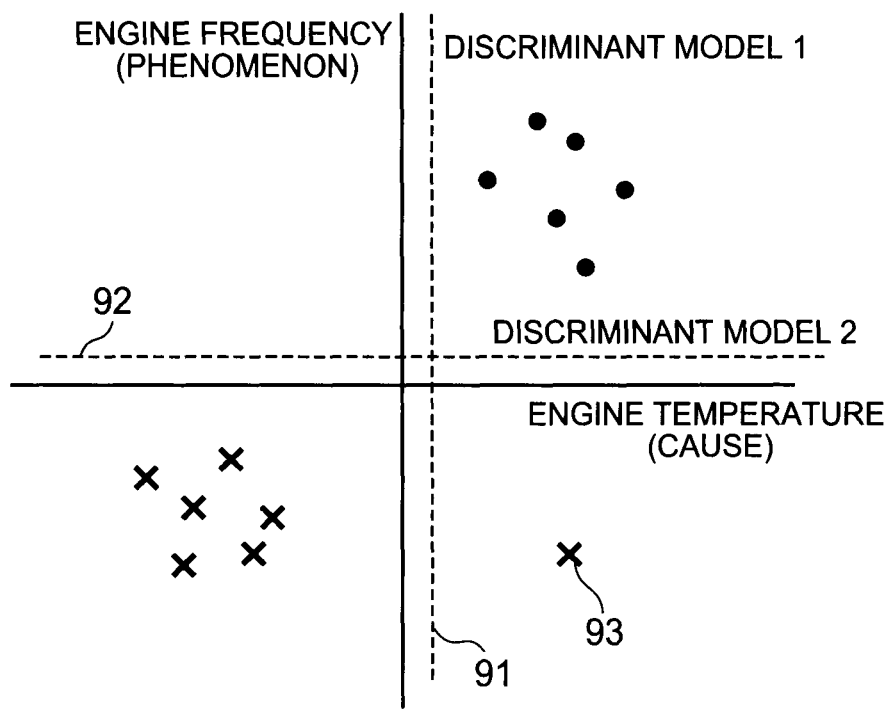
FIG. 12 is an explanatory diagram showing an exemplary method for learning a discriminant model.

The outline of the present invention will be described below. FIG. 11 is a block diagram showing the outline of a discriminant model learning device according to the present invention. The discriminant model learning device according to the present invention (the discriminant model learning device 100, for example) comprises a query candidate storage means 81 (the query candidate storage unit 104, for example) for storing candidates of a query which is a model to be given with domain knowledge indicating a user's intension, a regularization function generation means 82 (the knowledge regularized generation processing unit 107, for example) for generating a regularization function (regularization function KR, for example) indicating compatibility (fitting) with domain knowledge based on the domain knowledge given to the query candidates, and a model learning means 83 (the model learning device 103, for example) for learning a discriminant model by optimizing a function (an optimization problem expressed in Formula 3, for example) defined by a loss function (a loss function $L(x^N, y^N, f)$, for example) and a regularization function predefined per discriminant model.

With the structure, while the fitting to the data can be kept, the discriminant model on which the domain knowledge indicating user's knowledge or analysis intention for the model is reflected can be efficiently learned.

The discriminant model learning device (the discriminant model learning device 200, for example) may comprise a model preference learning means (the model preference learning device 201, for example) for learning a model preference as a function indicating domain knowledge based on the domain knowledge. The regularization function generation means 82 may generate a regularization function by use of the model preference.

With the structure, even when less domain knowledge is input, a regularization function can be appropriately generated.

The discriminant model learning device (the discriminant model learning device 300, for example) may comprise a query candidate generation means (the query candidate generating device 301, for example) for generating query candidates in which the domain knowledge given by the user is reduced or query candidates in which queries having a significantly low discrimination accuracy are deleted from multiple queries.

With the structure, even when proper query candidates are not present, an increase in cost for obtaining the domain knowledge and the need of inputting much domain knowledge are prevented.

The discriminant model learning device (the discriminant model learning device 400, for example) may comprise an optimized query generation means (the optimized query generating device 401, for example) for extracting queries having low uncertainty of a discriminant model learned when the domain knowledge is given thereto from query candidates.

With the structure, the domain knowledge is given to query candidates having high uncertainty so that an accuracy in estimating a regularization term based on the domain knowledge can be enhanced and consequently an accuracy in discrimination learning can be enhanced.

The discriminant model learning device may comprise a domain knowledge input means (the domain knowledge input device 105, for example) for inputting domain knowledge given by the user to queries extracted by the optimized query generation means. Then, the regularization function generation means 82 may generate a regularization function based on the domain knowledge given to the queries by the user.

The present invention is suitably applied to a discriminant model learning device for learning a discriminant model for discriminating data.

What is claimed is:

1. A discriminant model learning device comprising:
   a query candidate storage unit for storing candidates of a query which is a model to be given with domain knowledge indicating a user's intention;
   a regularization function generation unit for generating a regularization function indicating compatibility with domain knowledge based on the domain knowledge given to the query candidates which is stored in the query candidate storage unit; and
   a model learning unit for learning a discriminant model by optimizing a function defined by a loss function and the regularization function predefined per discriminant model,
   wherein the domain knowledge indicates whether the model candidate is suitable for a discriminant model or indicates which model is more suitable among model candidates, and
   the regularization function is defined as a function having a value to be optimized as the query is more similar to a suitable model.

2. The discriminant model learning device according to claim 1, comprising a model preference learning unit for learning a model preference as a function indicating domain knowledge based on the domain knowledge,
   wherein the regularization function generation unit uses the model preference to generate a regularization function.

3. The discriminant model learning device according to claim 1, comprising a query candidate generation unit for generating query candidates in which domain knowledge to be given by a user is reduced or query candidates in which queries having a significantly low discrimination accuracy are deleted from a plurality of queries, and for storing the query candidates in the query candidate storage unit.

4. The discriminant model learning device according to claim 1, comprising an optimized query generation unit for extracting, from query candidates, queries having low uncertainty of a discriminant model learned when domain knowledge is given,
   wherein the regularization function generation unit generates the regularization function based on the domain knowledge given to the query candidates extracted by the optimized query generation unit.

5. The discriminant model learning device according to claim 4, comprising a domain knowledge input unit for inputting domain knowledge to be given by a user to the queries extracted by the optimized query generation unit,
   wherein the regularization function generation unit generates a regularization function based on the domain knowledge given to the queries by the user.

6. A discriminant model learning method comprising the steps of:
   generating a regularization function indicating compatibility to domain knowledge indicating a user's intention based on the domain knowledge given to candidates of a query which is a model to be given with the domain knowledge; and
   learning a discriminant model by optimizing a function defined by a loss function and the regularization function predefined per discriminant model,
   wherein the domain knowledge indicates whether the model candidate is suitable for a discriminant model or indicates which model is more suitable among model candidates, and
   the regularization function is defined as a function having a value to be optimized as the query is more similar to a suitable model.

7. The discriminant model learning method according to claim 6, comprising the steps of:
   learning a model preference as a function indicating domain knowledge based on the domain knowledge; and
   generating a regularization function by use of the model preference.

8. A non-transitory computer readable information recording medium storing a discriminant model learning program that, when executed by a processor, performs a method for:
   generating a regularization function indicating compatibility to domain knowledge indicating a user's intention based on the domain knowledge given to candidates of a query which is a model to be given with the domain knowledge; and
   learning a discriminant model by optimizing a function defined by a loss function and the regularization function predefined per discriminant model,
   wherein the domain knowledge indicates whether the model candidate is suitable for a discriminant model or indicates which model is more suitable among model candidates, and
   the regularization function is defined as a function having a value to be optimized as the query is more similar to a suitable model.

9. The non-transitory computer readable information recording medium according to claim 8, further comprising:
   learning a model preference as a function indicating domain knowledge based on the domain knowledge; and
   generating a regularization function by use of the model preference.

* * * * *